April 26, 1960

G. W. LANE ET AL 2,934,130

APPARATUS FOR FORMING A ROUND TUBE FROM FLAT SHEET MATERIAL

Filed Dec. 20, 1955

INVENTORS.
G. William Lane
J. Gayle Sawicki
By Carlson, Pitzner
Hubbard Florik attorneys April 26, 1960   G. W. LANE ET AL   2,934,130
APPARATUS FOR FORMING A ROUND TUBE FROM FLAT SHEET MATERIAL
Filed Dec. 20, 1955   5 Sheets-Sheet 4

INVENTORS.
G. William Lane
J. Gayle Sawicki
By Carlson, Pitzner,
Hubbard & Wolfe attorneys April 26, 1960 G. W. LANE ET AL 2,934,130
APPARATUS FOR FORMING A ROUND TUBE FROM FLAT SHEET MATERIAL
Filed Dec. 20, 1955 5 Sheets-Sheet 5
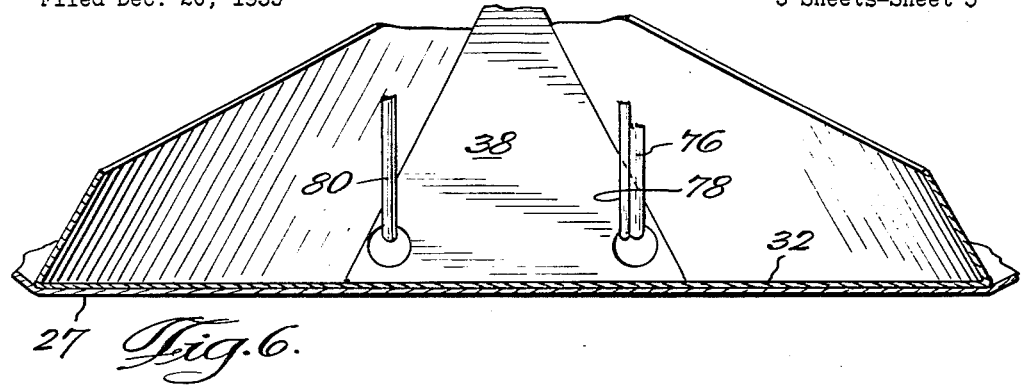
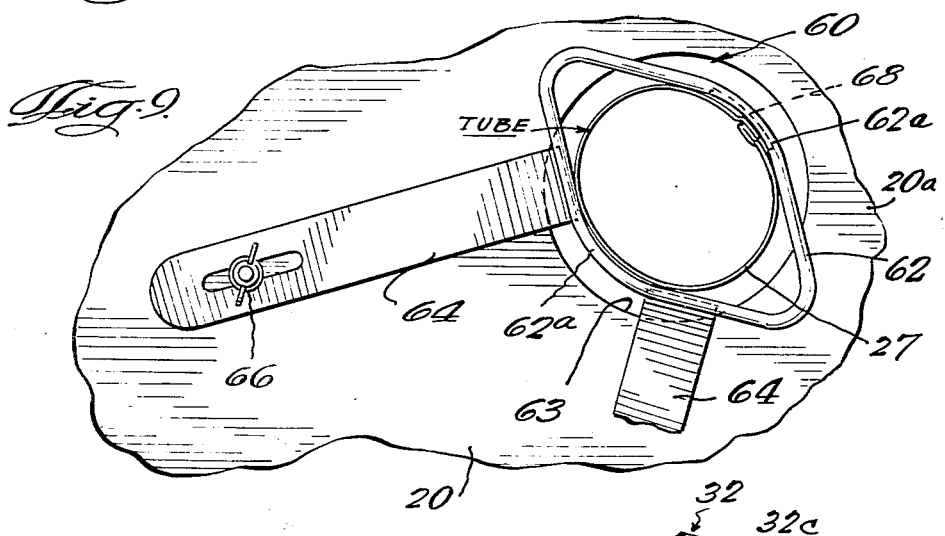
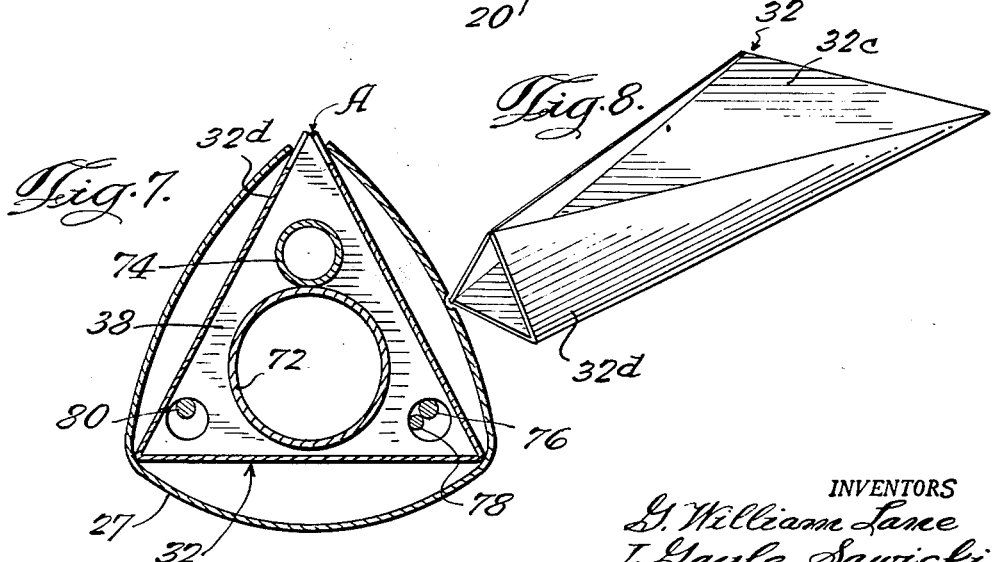
INVENTORS
G. William Lane
J. Gayle Sawicki
By Carlson, Pitzner, Hubbard & Wolfe
Attorneys United States Patent Office 2,934,130
Patented Apr. 26, 1960

2,934,130

APPARATUS FOR FORMING A ROUND TUBE FROM FLAT SHEET MATERIAL

George William Lane and John Gayle Sawicki, Omaha, Nebr., assignors to Liqua-Pak, Inc., Omaha, Nebr., a corporation of Nebraska Application December 20, 1955, Serial No. 554,167

15 Claims. (Cl. 154—1.8)

The present invention relates to a method of forming a round tube from a continuous web of sheet material, and an apparatus for practicing such method. More particularly, the invention concerns a method and apparatus for forming such a round tube having an exterior lap type tube seam.

It is a general object of the present invention to provide a novel method for continuously forming from a web of sheet material a round tube having a longitudinal seam disposed along the exterior of the tube, and an apparatus for practicing this method.

More specifically, it is an object of the invention to provide a method and apparatus for curling the longitudinal edges of a moving web of sheet material toward one another so that the marginal portions thereof assume an outstanding side-by-side relationship for facilitating formation therealong of an exterior longitudinal tube seam.

A further detailed object of the invention is to provide a novelly shaped former element for effecting the above-mentioned edge curling action, and roller means for co-operating with the former element to deftly place the marginal sheet portions together in outstanding seam forming relationship.

Another object is to form a smoothly contoured sealed tube by providing means for folding over the outstanding tube seam so that the seam fits snugly against the tube proper.

Finally, it is an object of the invention to provide a tube forming apparatus which is simple, economically manufactured, and requires a minimum of care and maintenance.

Other objects and advantages of the invention will become apparent upon reference to the following description taken in conjunction with the accompanying drawings, in which:

Fig. 2 is an enlarged fragmentary front elevation, partly in section, of the tube forming apparatus shown in Fig. 1, with the seam sealing assembly not shown.

Figure 3:
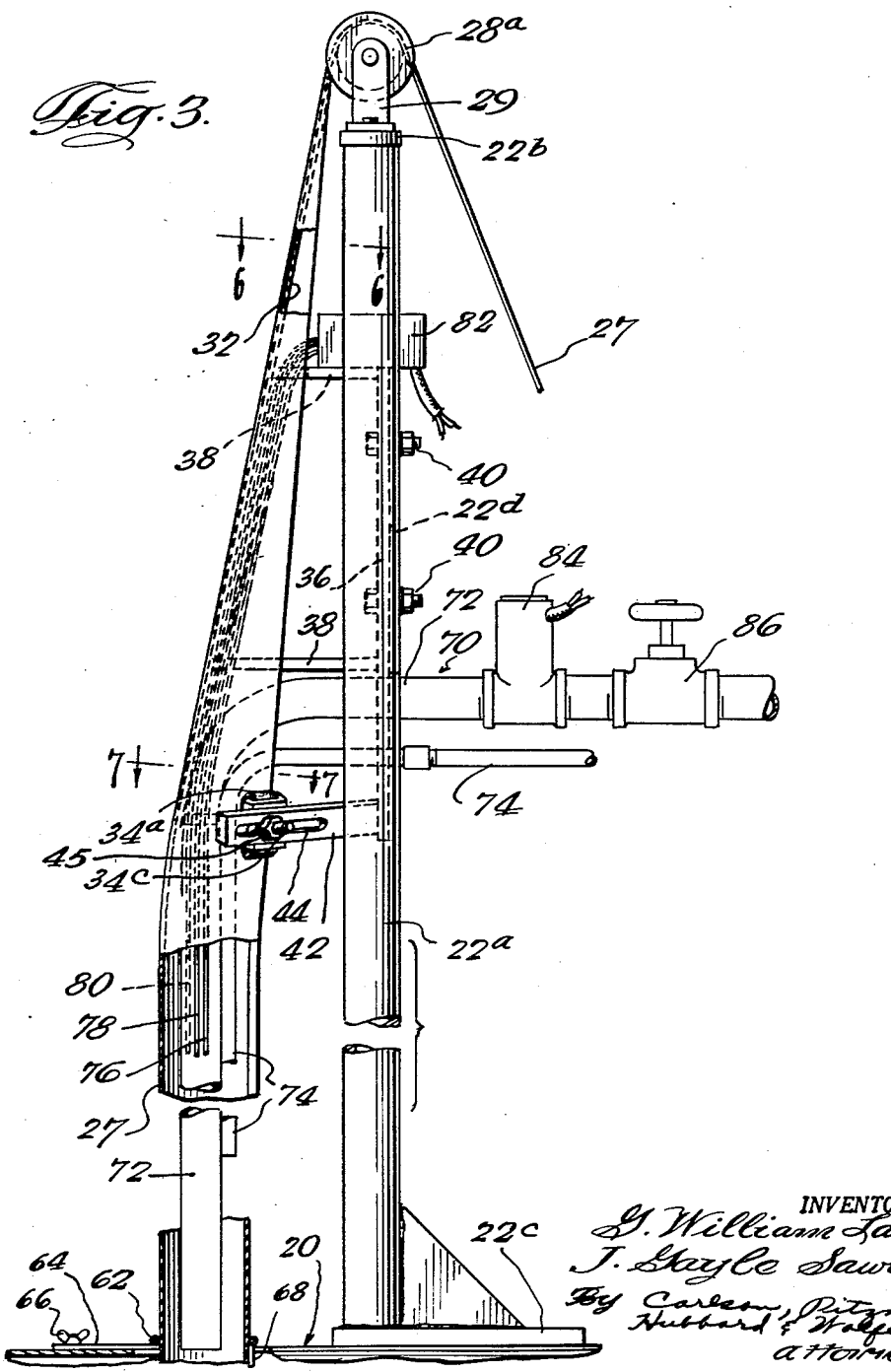
Fig. 3 is a fragmentary side elevation, also partly in section, of the illustrative apparatus shown in Figs. 1 and 2.

Figs. 6 and 7 are transverse sectional views taken along the lines 6—6 and 7—7, respectively, in Fig. 3, showing progressive stages of the tube forming operation.

Figure 4:
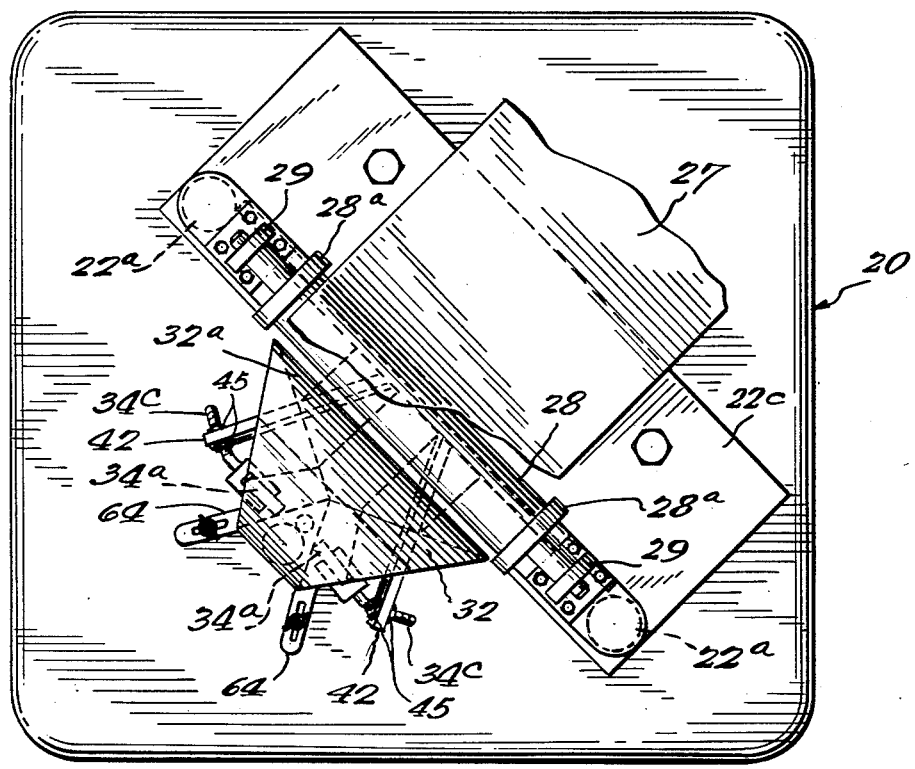
Fig. 4 is a plan view of the tube forming apparatus and the machine shown in Fig. 1.

Fig. 8 is a perspective view of the tube forming element shown in Figs. 2, 3 and 4.

Fig. 9 is a fragmentary plan view taken along the line 9—9 in Fig. 3 showing the tube seam folding device employed in practicing the invention.

Figure 1:
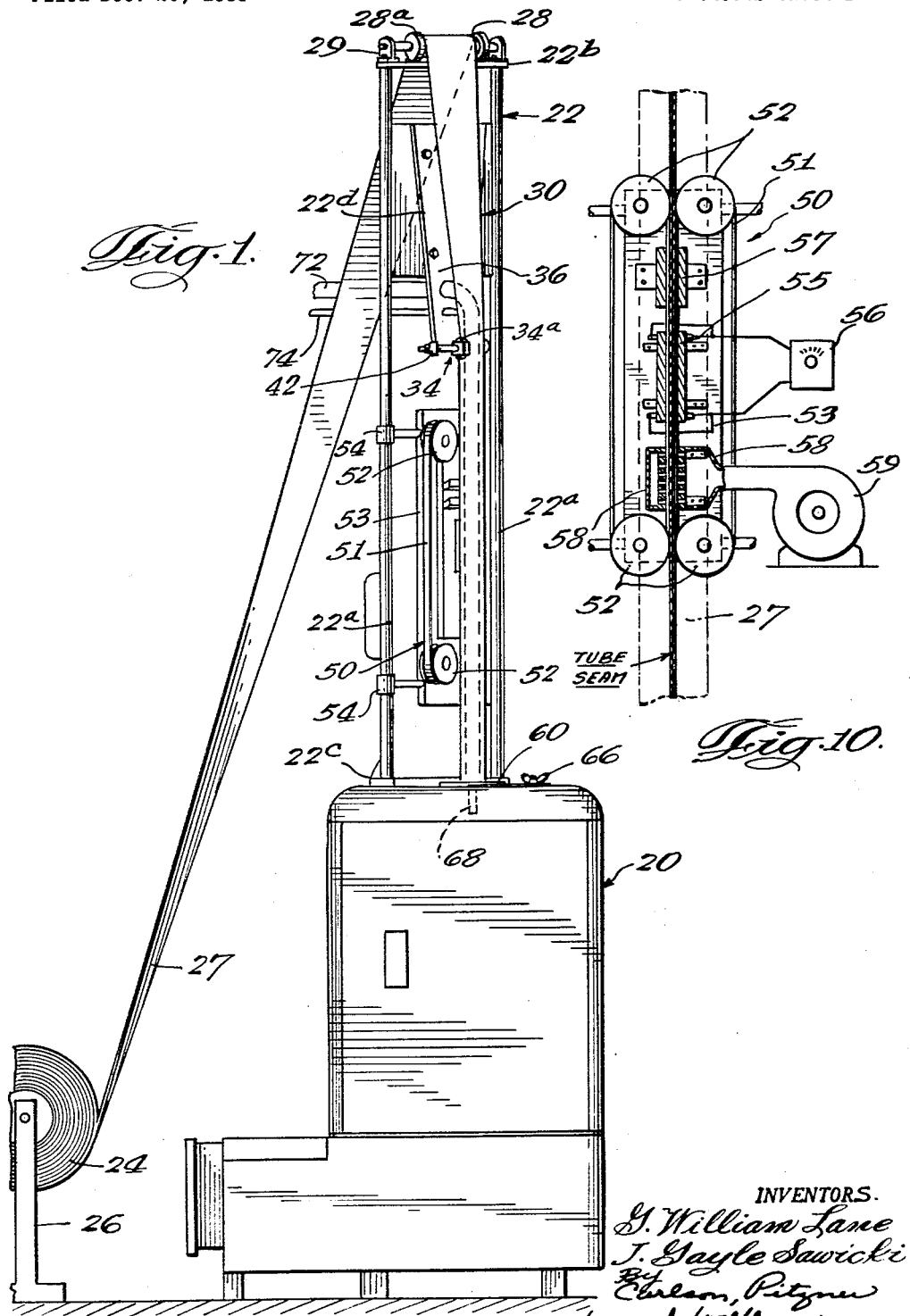
Figure 1 is an elevation view of a machine which requires round tubular material to be fed thereto, showing in perspective an illustrative tube forming apparatus mounted above the machine.

Fig. 10 is an enlarged elevation view, partly in section, showing the details of the tube seam sealing assembly shown in Fig. 1.

While the invention has been described in connection with a preferred embodiment thereof, it will be understood that it is not intended to limit the invention thereto, but rather it is intended to cover all alternative methods, constructions and modifications falling within the spirit and scope of the appended claims.

Turning now to the drawings, the invention is shown associated with a typical machine 20 of the type requiring round tubular material to be continuously fed thereto. Such machine may, for example, be a container forming machine of the general type described in our co-pending application for U.S. Letters Patent, Serial No. 544,270, filed December 20, 1955.

The tube forming apparatus which is the subject of the present invention takes the form of a superstructure arranged above the machine 20 and supported thereby. The illustrative apparatus comprises, in general, an assembly for forming from a web of sheet material a round tube having its longitudinal marginal portions in face-to-face seam sealing relationship, an assembly for sealing the marginal side-by-side tube portions together to form a longitudinal external seam along the tube, and a device for folding the outstanding seam over against the tube proper to present a smooth round external tube contour.

As will be seen from Fig. 1, the tube forming assembly 30, the seam sealing assembly 50, and the seam folding device 60 are arranged in vertically spaced relationship above the illustrative machine 20. The tube forming and seam sealing assemblies 30, 50 are mounted on the upper and lower portions, respectively, of an elongated supporting frame 22 provided above the machine 20.

From Figs. 1 and 3, it will be observed that the frame 22 comprises a pair of spaced, vertical pipes 22a closed at their upper and lower ends by end plates 22b and 22c, respectively, and having a vertically arranged support plate 22d spanning the pipes intermediate the ends of the frame. The seam folding device 60 is located at the foot of the frame, being secured in the top of the machine 20.

Since continuously formed tubes such as those produced according to the present invention are usually subsequently fed to a container forming machine such as that disclosed in the above referred to co-pending application for patent, the sheet material employed to form such tubes is preferably of a type adapted for container use. Such sheet material may advantageously be formed of paper, cloth, metal foil, plastic materials of various kinds, and the like. In the illustrative apparatus, the sheet material employed is paper containing on one side thereof a coating of thermoplastic material, such as wax, polyethylene, polyvinylidene chloride, or the like. Such coated paper is thus heat sealable, and the illustrative seam sealing assembly performs a heat sealing operation.

As shown, a roll 24 of heat sealable paper carried by a suitable roll stand 26 is located near the machine 20 for continuously supplying a web 27 of paper to the tube forming apparatus. Positioned on top of the supporting frame's upper end plate 22b is an elongated, horizontally disposed idler roller 28 over which the web of sheet material is carried. As will be seen, the roller 28 is carried by suitable brackets 29 and includes a pair of axially spaced shoulders 28a which serve to properly align the web for passage through the tube forming apparatus.

In carrying out the invention, the tube forming assembly 30 includes an elongated former element 32 along which the web is passed and a pair of forming rollers 34 for cooperating with one end of the element to impart a round contour to the web and for guiding the longitudinal marginal portions of the web into side-by-side seam forming position. In this instance, the former element 32 comprises a plate integrally formed of thin metal having a straight edge cross section at its upper end 32a and gradually generated over its length into a triangular shape at its lower end 32b.

Referring particularly to Fig. 8, the former plate 32 comprises a flat parallelogram shaped portion 32c and a pair of elongated triangularly shaped portions 32d integral therewith and oppositely disposed along the length of the portion 32c, the bases of the triangle portions being at the lower end 32b of the plate where they cooperate with the lower end of portion 32c in forming a closed triangular cross section. It will be noted that the parallelogrammic plate portion 32c tapers inwardly from the upper end 32a of the plate to the lower end 32b so that the width of the lower end is substantially less than that of the upper end. It is important to observe (Fig. 2) that the width or periphery of the upper plate end 32a is substantially the same as or slightly greater than the width of the web 27. On the other hand the periphery of the lower plate end 32b is considerably less than the width of the web 27, the latter having a width approximately 1½ times greater than the periphery of the lower plate end 32b. As will be presently explained, such dimensional relationship facilitates proper tube formation.

For mounting the former plate 32 on the supporting frame 22, a vertical mounting plate 36 (Figs. 2 and 3) is provided carrying a series of horizontal gusset members 38 suitably secured between the former and mounting plates 32, 36 as by welding. The vertical mounting plate 36 is in turn fastened against the supporting frame plate 22d by a plurality of bolt and nut assemblies 40.

It will be observed that the upper end 32a of the former plate is of approximately the same width as the idler roller 28 and is arranged just below this roller for receiving the web therefrom. Also, the lower end 32b of the plate is held farther outwardly from the frame 22 than is the upper plate end so that the former plate assumes a position somewhat angularly displaced from the vertical. Thus, it will be seen that as the web 27 is directed downwardly from the idler roller 28 along and in contact with the former plate 32, the longitudinal edges of the web tend to curl or wrap around the former plate. Such curling occurs to a greater degree as the web contacts the lower portions of the former plate where the width of the plate becomes progressively smaller while the plate at the same time assumes a triangular shape.

Attention may now be given to the specific arrangement of forming rollers 34 provided at the lower end 32b of the former plate. As will be seen from Figs. 2 and 3, the rollers 34 are of conventional design, each having a caster 34a journaled in a yoke 34b. In this instance, the rollers 34 are adjustably mounted upon flatbar supports 42 which extend outwardly from the vertical mounting plate 36 to position the rollers adjacent the lower end 32b of the forming plate. An integral screw threaded stud 34c extends from each of the roller yokes 34b and is received in a slot 44 provided along the outer end of each of the flatbars 42, the stud being engaged by a nut 45. In this way the roller 34 is longitudinally adjustable along the slotted flatbar 42.

Attention is drawn to the fact that the rollers 34 are obliquely directed rearwardly against the web 27 passing over the triangular lower portion of the former plate. As will be observed from Figs. 2, 3 and 5, the cocked rollers 34 press opposing portions of the curled web 27 against the bases of the triangular plate portions 32d in such a manner as to push the sheet material 27 completely around the lower end 32b of the former plate. From Fig. 5 it is seen that the marginal portions of the sheet material are guided past the rear apex A of the triangular plate end and into side-by-side seam forming relationship with one another. The sizing of the lower end 32b of the former plate so that the plate periphery is substantially less than that of the sheet material 27 is thus seen to facilitate guiding the marginal sheet portions into the proper seam forming position.

Figure 5:
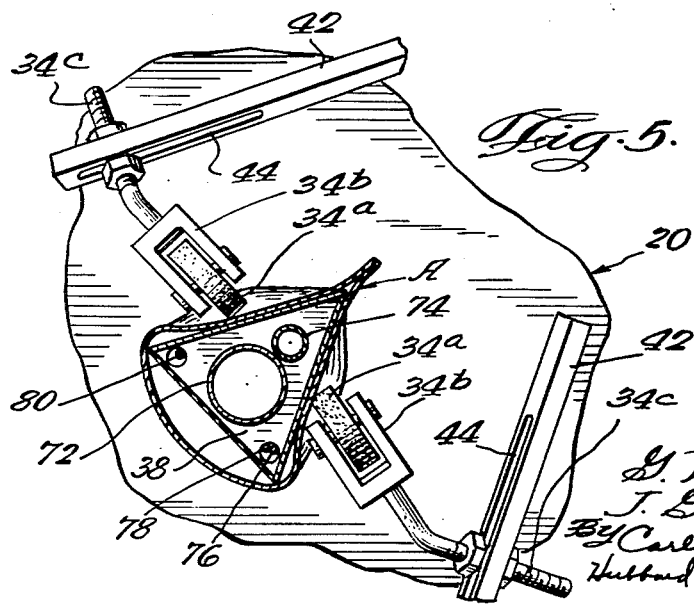
Fig. 5 is a transverse sectional view taken along the line 5—5 in Fig. 2, showing the marginal portions of the sheet material in seam forming relationship.

Thus, as the sheet material 27 passes downwardly over the lower end 32b of the former plate, the marginal portions of the sheet are in side-by-side relation with the thermoplastic coated interior surfaces face-to-face and ready to be heat sealed one against the other. The shape of the tube being formed is, at the lower former plate end 32b, substantially triangular, with the sheet material naturally tending to assume a circular shape, as shown in Fig. 5.

When the tube passes downwardly past the former plate and into the seam sealing assembly 50, the marginal sheet portions are firmly grasped and held together by the sealing assembly and the tube assumes a natural round shape since the forming action of the rollers 34 and former plate 32 is no longer present. The seam sealing assembly 50 shown in Figs. 1 and 10 is of conventional design, including a pair of endless metal bands 51, each mounted on vertically spaced upper and lower sprockets 52, the pairs of sprockets being arranged side-by-side and spaced apart to provide a small gap between the adjacent portions of the metal bands for the passage therethrough of the marginal portions of the sheet material 27. The assembly is mounted on a rectangular plate 53 which is in turn supported from the lower portion of the frame 22 by suitable brackets 54. The seam sealing assembly is thus arranged below the former plate 32 and is adapted to receive the marginal portions of the round tube, the tube proper being positioned forwardly of the sealing assembly.

With particular reference to Fig. 10, it will be observed that the seam sealing assembly 50 includes a pair of oppositely arranged heating shoes 55 connected to a suitable source of electrical current through a temperature control box 56, and arranged to bear against the moving metal bands 51. In this way the metal bands 51 are heated and, being in direct contact with the marginal tube seam portions, are effective to melt the thermoplastic inner seam coating and cause the marginal sheet portions to adhere to each other to form a sealed longitudinal tube seam. Spaced above and below the heating shoes 55 and also mounted on the plate 53 are similarly opposed pairs of seam guide members 57 and vent members 58, respectively, the latter being connected to a suitable air blower 59, which is provided for cooling the heated tube seam. Such cooling facilitates setting of the thermoplastic tube coating into a non-plastic seam holding state, thus assuring a tightly sealed tube seam when the continuously moving tube passes the lower end of the sealing assembly 50.

The present invention is also connected with the provision of a seam folding device 60 at the extreme lower end of the tube forming apparatus. The function of this device is to operate upon the tube emerging from the seam sealing assembly 50 to fold over the sealed tube seam against the body of the tube proper. Upon particular reference to Fig. 9, it will be seen that the illustrative seam folding device 60 includes an oblong shaped ring 62 formed from round bar and supported in the center of the top 20a of the machine 20 by a pair of flatbar supports 64 secured to the machine top by suitable bolts and wingnuts 66. The center of the machine top 20a is appropriately cut out as at 63 for receiving the tube.

As will be seen from the drawings, the oblong ring 62 is adapted to recive the tube therethrough and includes opposing central, arc-shaped portions 62a which conform to the curvature of similarly opposing portions of the tube. The ring 62 is sized to snugly receive the round tube and is so oriented with respect to the tube that one of the arc-shaped portions 62a is adaptable to engage the tube seam during passage of the tube through the ring.

Attention is drawn to the provision of a curved folder member 68 which is rigid with and depends from that central ring portion 62a which engages the tube seam. The folder member 68 is generally rectangular in shape as shown and its curvature conforms to that of the ring portion 62a, and correspondingly to the tube curvature.

Thus, as the round tube with the outstanding seam passes downwardly from the seam sealing assembly 50 through the ring 62, the seam is folded over against the tube proper upon engaging the adjacent ring portion 62a. As the tube passes further downwardly through the ring 62, the entire length of the folder member 68 bears tightly against the folded tube seam to firmly crease the seam against the tube proper. The result is a smoothly contoured round tube which is ruggedly constructed and may be easily handled, especially where the tube is to be further processed in a container forming machine or the like.

A further advantageous feature of the seam folding device 60 is that it also acts as a centering means for assuring exact positioning of the round tube within the machine 20 for facilitating operations to be performed upon the tube by the machine.

When the illustrative apparatus is employed with a container forming and filling machine, such as that disclosed in the above-referred-to, co-pending application for patent, it is often desirable to incorporate therewith a tube filling assembly. Accordingly, there is shown in the drawings, such a filling assembly 70 which includes a liquid filling pipe 72 supported horizontally by the mounting and frame support plates 36, 22d, respectively. From Fig. 3, it will be seen that the filling pipe 72 is turned 90° downwardly after passing through the plates 36, 22d, and extends downwardly through the triangular lower end 22b of the former plate so as to be concentrically disposed within the tube being formed. The filling pipe 72 is preferably extended downwardly past the seam sealing assembly 50 and the seam folding device 60 and into the machine 20.

It may also be desirable to furnish a suction pipe 74 connected with a suitable vacuum source (not shown) and arranged adjacent the filling pipe 72 but terminating somewhat above the lower end thereof for the removal of liquid foam from within the tube being filled.

Also shown in the drawings are liquid level control elements, including high and low level electrodes, 76, 78, respectively, and a positive shut-off electrode 80. All of the electrodes are connected to an electrical control box 82 mounted in the upper portion of the frame 22, and extend downwardly behind the former plate 32 and into the center of the tube being filled. The control box 82 is electrically connected to a solenoid operated valve 84 which controls the supply of fluid to the filling pipe 72. A manually operable valve 86 is shown in the filling pipe 72, on the upstream side of the solenoid valve 84 for manual control of the filling operation if such is desired. As shown in Figs. 5, 6 and 7, suitable holes are provided in the gussets 38 for passage therethrough of the round paper tube, the liquid filling and foam removing pipes 72, 74, and the liquid level responsive electrodes, 76, 78, and 80.

We claim:

1. An apparatus for forming a continuous tube having an exterior lap seam from a web of material comprising, in combination, a former element, means for supporting said former element, means including a pair of opposing rollers mounted on said supporting means and engageable against the former element for curling the web material around the former element to bring marginal portions of the material into side-by-side seam forming relation, means for sealing together said marginal side-by-side portions of the material to form an outstanding external tube seam, and means for folding over said outstanding seam against the tube proper for effecting a smooth round tube contour.

2. An apparatus for forming a continuous tube having an exterior lap seam from a web of material comprising, in combination, a former element, means for supporting said former element, means for curling the web material around the former element to bring marginal portions of the material into side-by-side seam forming relation, means for sealing together said marginal side-by-side portions of the material to form an outstanding external tube seam, and means for folding over said outstanding seam against the tube proper for effecting a smooth round tube contour.

3. An apparatus for forming a continuous tube having an exterior lap seam from a web of material comprising, in combination, an elongated former element, means for supporting said former element, said former element being tapered from a straight edge cross section at one end thereof to a triangular cross section at its other end, means for curling the web material around the former element to bring marginal portions of the material into side-by-side seam forming relation, and means for sealing together said marginal side-by-side portions of the material to form an outstanding external tube seam.

4. An apparatus for forming a continuous tube having an exterior lap seam from a web of heat sealable material comprising, in combination, a former element, means for supporting said former element, means for curling the web material around the former element to bring marginal portions of the material into side-by-side seam forming relation, means for heat sealing together said marginal side-by-side portions of the material to form an outstanding external tube seam, and means for folding over said outstanding seam against the tube proper for effecting a smooth round tube contour.

5. An apparatus for forming a continuous tube having an exterior lap seam from a web of material coated on one side with a thermoplastic film comprising, in combination, a former element, means for supporting said former element, means for curling the web material around the former element to bring the inner coated surfaces of marginal portions of the material into side-by-side seam forming relation, means for heat sealing together said marginal side-by-side portions of the material to form an outstanding external tube seam, and means for folding over said outstanding seam against the tube proper for effecting a smooth round tube contour.

6. An apparatus for forming a continuous tube having an exterior lap seam from a web of heat sealable material comprising, in combination, a former element, means for supporting said former element, means including rollers engageable against the former element for curling the web material around the former element to bring marginal portions of the material into side-by-side seam forming relation, means for heat sealing together said marginal side-by-side portions of the material to form an outstanding external tube seam, and means for folding over said outstanding seam against the tube proper for effecting a smooth round tube contour.

7. An apparatus for forming a continuous tube having an exterior lap seam from a web of material comprising, in combination, an elongated former element, means for supporting said former element, said former element being tapered from a straight edge cross section at one end thereof to a triangular cross section at its other end, means including a pair of opposing rollers mounted on said supporting means and engageable against the triangular end of the former element for curling the web material around the former element to bring marginal portions of the material into side-by-side seam forming relation, means for sealing together said marginal side-by-side portions of the material to form an outstanding external tube seam and means for folding over said outstanding seam against the tube proper for effecting a smooth round tube contour.

8. An apparatus for forming a continuous tube having an exterior lap seam from a web of heat sealable material comprising, in combination, a former element, means for supporting said former element, means for curling the web material around the former element to bring marginal portions of the material into side-by-side seam forming relation, said last-mentioned means including a pair of rollers arranged on opposite sides of one end of the former element and cocked thereagainst for pushing the web material completely around the former element, means for heat sealing together said marginal side-by-side portions of the material to form an outstanding external tube seam, and means for folding over said outstanding seam against the tube proper for effecting a smooth round tube contour.

9. An apparatus for forming a continuous tube having an exterior lap seam from a web of heat sealable material comprising, in combination, an elongated former element, means for supporting said former element, said former element being tapered from a straight edge cross section at one end thereof to a triangular cross section at its other end, means for curling the web material around the former element to bring marginal portions of the material into side-by-side seam forming relation, said last-mentioned means including a pair of rollers arranged on opposite sides of the triangular end of the former element and cocked thereagainst for pushing the web material completely therearound, means for heat sealing together said marginal side-by-side portions of the material to form an outstanding external tube seam, and means for folding over said outstanding seam against the tube proper for effecting a smooth round tube contour.

10. An apparatus for forming a continuous tube having an exterior lap seam from a web of heat sealable material comprising, in combination, an elongated former element, means for supporting said former element, said former element being tapered from a straight edge cross section at one end thereof to a triangular cross section at its other end with its straight edge being of greater width than the periphery of the triangular cross section, means for curling the web material around the former element to bring marginal portions of the material into side-by-side seam forming relation, said last-mentioned means including a pair of rollers arranged on opposite sides of the triangular end of the former element and cocked thereagainst for pushing the web material completely therearound, means for heat sealing together said marginal side-by-side portions of the material to form an outstanding external tube seam, and means for folding over said outstanding seam against the tube proper for effecting a smooth round tube contour.

11. An apparatus for forming a continuous tube having an exterior lap seam from a web of heat sealable material comprising, in combination, an elongated former element, means for supporting said former element, said former element being tapered from a straight edge cross section at one end thereof to a triangular cross section at its other end with its straight edge being at least one and one-half times greater in width than the periphery of the triangular cross section, means for curling the web material around the former element to bring marginal portions of the material into side-by-side seam forming relation, said last mentioned means including a pair of rollers arranged on opposite sides of the triangular end of the former element and cocked thereagainst for pushing the web material completely therearound, means for heat sealing together said marginal side-by-side portions of the material to form an outstanding external tube seam, and means for folding over said outstanding seam against the tube proper for effecting a smooth round tube contour.

12. An apparatus for forming a continuous tube having an exterior lap seam from a web of material comprising, in combination, a former element, means for supporting said former element, means for curling the web material around the former element to bring marginal portions of the material into side-by-side seam forming relation, means for sealing together said marginal side-by-side portions of the material to form an outstanding external tube seam, and means including a ring shaped member for folding over said outstanding seam against the tube proper for effecting a smooth tube contour.

13. An apparatus for forming a continuous tube having an exterior lap seam from a web of material comprising, in combination, an elongated former element, means for supporting said former element, said former element being tapered from a straight edge cross section at one end thereof to a triangular cross section at its other end, means for curling the web material around the former element to bring marginal portions of the material into side-by-side seam forming relation, means for sealing together said marginal side-by-side portions of the material to form an outstanding external tube seam, and means including an oblong ring for folding over said outstanding seam against the tube proper for effecting a smooth tube contour, said oblong ring having a folder member secured thereto for engaging and firmly pressing the folded seam against the tube to assure a permanently folded lap seam.

14. An apparatus for forming a tube having an exterior longitudinal seam from a web of material comprising, in combination, a former plate, means for supporting said former plate substantially co-planar to the web of material, said former plate being tapered over its length from a straight edge cross-section at its first end to a triangular cross-section at its second end, a pair of rollers mounted on said supporting means and obliquely directed against opposite sides of the plate near its triangular end for drawing the marginal portions of the web about the plate and guiding said portions together in side-by-side relation, means for tightly sealing together said side-by-side web portions to form an outstanding longitudinal tube seam, and means for folding over said outstanding seam against the tube to effect a smooth round tube contour.

15. In an apparatus for forming a continuous round tube from a web of material, a tube forming element having first and second ends arranged for passage of the web successively thereover, said forming element being tapered over its length from a straight edge cross-section at its first end, substantially equal in width to the web to a triangular cross-section at its second end, the periphery of said triangular second end being substantially less than the width of said web for facilitating progressive wrapping of the web about the forming element to form a round tube as the web moves along said element.

References Cited in the file of this patent

UNITED STATES PATENTS

| | | |
|---|---|---|
| 2,113,658 | Lakso | Apr. 12, 1938 |
| 2,140,213 | Tegarty | Dec. 13, 1938 |
| 2,176,370 | Wagner | Oct. 17, 1939 |
| 2,237,537 | Yeates et al. | Apr. 8, 1941 |
| 2,272,530 | Patterson | Feb. 10, 1942 |
| 2,491,048 | Jenkins | Dec. 13, 1949 |
| 2,607,696 | Kunz | Aug. 19, 1952 |
| 2,660,219 | Haas et al. | Nov. 24, 1953 |
| 2,718,915 | Piazze | Sept. 27, 1955 |